US009551809B2

(12) United States Patent
Barry et al.

(10) Patent No.: US 9,551,809 B2
(45) Date of Patent: Jan. 24, 2017

(54) ARRAYED WAVE DIVISION MULTIPLEXING TO IMPROVE SPATIAL RESOLUTION OF IOFDR FIBER BRAGG SENSING SYSTEM

(71) Applicants: Alexander M. Barry, Cypress, TX (US); Brooks Childers, Christiansburg, VA (US); Roger Duncan, Christiansburg, VA (US)

(72) Inventors: Alexander M. Barry, Cypress, TX (US); Brooks Childers, Christiansburg, VA (US); Roger Duncan, Christiansburg, VA (US)

(73) Assignee: BAKER HUGHES INCORPORATED, Houston, TX (US)

( * ) Notice: Subject to any disclaimer, the term of this patent is extended or adjusted under 35 U.S.C. 154(b) by 168 days.

(21) Appl. No.: 14/614,126

(22) Filed: Feb. 4, 2015

(65) Prior Publication Data

US 2016/0223710 A1 Aug. 4, 2016

(51) Int. Cl.
| | |
|---|---|
| *G01D 5/353* | (2006.01) |
| *G01V 8/16* | (2006.01) |
| *G02B 6/34* | (2006.01) |
| *G01M 11/00* | (2006.01) |
| *E21B 47/00* | (2012.01) |

(52) U.S. Cl.
CPC ............... *G01V 8/16* (2013.01); *E21B 47/00* (2013.01); *G01M 11/3172* (2013.01); *G02B 6/34* (2013.01)

(58) Field of Classification Search
CPC .... G01J 3/1895; G01D 5/353; G01D 5/35316; G01D 5/35335

USPC ......................................................... 356/478
See application file for complete search history.

(56) References Cited

U.S. PATENT DOCUMENTS

| | | | |
|---|---|---|---|
| 6,317,539 B1* | 11/2001 | Loh ..................... | G02B 6/2932 385/123 |
| 8,983,250 B2* | 3/2015 | Black ................... | G01J 3/1895 385/37 |
| 9,404,831 B2* | 8/2016 | Barry ................ | G01M 11/3172 |
| 2010/0078164 A1 | 4/2010 | Bostick et al. | |

(Continued)

OTHER PUBLICATIONS

Butov, et al.; "Versatile in-Fiber Bragg Grating Pressure Sensor for Oil and Gas Industry"; 2006; Russia; 4 pages.

(Continued)

*Primary Examiner* — Jonathan Hansen
(74) *Attorney, Agent, or Firm* — Cantor Colburn LLP

(57) ABSTRACT

A downhole property measurement apparatus includes an optical fiber having a series fiber Bragg gratings with interleaved resonant wavelengths such that adjacent fiber Bragg gratings have different resonant wavelengths and a difference between adjacent resonant wavelengths is greater than a dynamic wavelength range of each of the adjacent fiber Bragg gratings. An optical interrogator is in optical communication with the optical fiber and configured to emit a frequency domain light signal having a swept wavelength for a first time duration and a chirp having a modulation of amplitude with a varying of wavelength for a second time duration that is less than the first time duration. A return light signal is transformed by the optical interrogator into a time domain to determine a resonant wavelength shift and corresponding location of each of the gratings. A processor converts the resonant wavelength shifts into the downhole property.

19 Claims, 4 Drawing Sheets

(56) References Cited

U.S. PATENT DOCUMENTS

| | | |
|---|---|---|
| 2012/0176250 A1 | 7/2012 | Duncan et al. |
| 2013/0093599 A1 | 4/2013 | Duncan et al. |
| 2014/0340235 A1 | 11/2014 | Taverner |
| 2015/0020598 A1 | 1/2015 | Wang |
| 2015/0285683 A1* | 10/2015 | Ouellette .............. G01J 3/0218 356/451 |

OTHER PUBLICATIONS

Notification of Transmittal of the International Search Report and the Written Opinion of the International Searching Authority, or the Declaration; PCT/US2015/067811; Mailing Date Mar. 29, 2016, 8 pages.

* cited by examiner

ARRAYED WAVE DIVISION MULTIPLEXING
TO IMPROVE SPATIAL RESOLUTION OF
IOFDR FIBER BRAGG SENSING SYSTEM

BACKGROUND

Hydrocarbons are typically produced using boreholes that penetrate reservoirs of the hydrocarbons. The boreholes, which can be several kilometers long, may be lined with structures such as casings or screens required for production purposes. Conditions in the borehole and these structures need to be monitored as a function of depth in order to prevent damage to the structures and efficiently produce the hydrocarbons. Hence, it would be well received in the hydrocarbon production industry if new technology was developed to sense borehole structural and environmental conditions as a function of depth that provide increased accuracy and cost effectiveness.

BRIEF SUMMARY

Disclosed is an apparatus for performing a measurement of a downhole property. The apparatus includes: an optical fiber having a series of sections with each section having a first fiber Bragg grating having a first resonant wavelength and a second fiber Bragg grating having a second resonant wavelength, a difference between the second resonant wavelength and the first resonant wavelength being greater than a dynamic wavelength range of each of the first and second fiber Bragg gratings, wherein fiber Bragg gratings are interleaved such that adjacent fiber Bragg gratings have different resonant wavelengths. The apparatus further includes an optical interrogator in optical communication with the optical fiber and configured to: emit a frequency domain light signal into the optical fiber, the frequency domain light signal having a swept wavelength for a first time duration and a chirp having a modulation of amplitude with a varying of wavelength for a second time duration that is less than the first time duration; receive a frequency domain return light signal from the optical fiber due to the emitted frequency domain light signal, the frequency domain return light signal having a resonant wavelength shift of each fiber Bragg grating due to the downhole property and a corresponding location of each fiber Brag grating; and transform the frequency domain return signal into a time domain in order to determine the resonant wavelength shift of each fiber Bragg grating and the corresponding location of each interrogated fiber Bragg grating. The apparatus further includes a processor configured to convert the resonant wavelength shift of each interrogated fiber Bragg grating into the downhole property measurement and an output interface coupled to the processor and configured to transmit a signal having the downhole property measurement and a corresponding location of the downhole property measurement to a signal receiving device.

Also disclosed is a method for performing a measurement of a downhole property. The method includes disposing an optical fiber into a borehole penetrating the earth, the optical fiber having a series of sections with each section having a first fiber Bragg grating having a first resonant wavelength and a second fiber Bragg grating having a second resonant wavelength, a difference between the second resonant wavelength and the first resonant wavelength being greater than a dynamic wavelength range of each of the first and second fiber Bragg gratings, wherein fiber Bragg gratings are interleaved such that adjacent fiber Bragg gratings have different resonant wavelengths. The method further includes illuminating the optical fiber with a frequency domain light signal using an optical interrogator, the frequency domain light signal having a swept wavelength for a first time duration and a chirp having a modulation of amplitude with a varying of wavelength for a second time duration that is less than the first time duration. The method further includes receiving a frequency domain return light signal from the optical fiber due to the emitted frequency domain light signal using the optical interrogator, the frequency domain return light signal having a resonant wavelength shift of each fiber Bragg grating due to the downhole property and a corresponding location of each fiber Brag grating. The method further includes transforming the frequency domain return light signal into a time domain to determine the resonant wavelength shift of each fiber Bragg grating due to the downhole property and the corresponding location of each fiber Bragg grating using the optical interrogator. The method further includes converting the resonant wavelength shift of each fiber Bragg grating into the downhole property measurement using a processor and transmitting, using an output interface, a signal having the downhole property measurement and the corresponding location to a signal receiving device.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Figure 1:
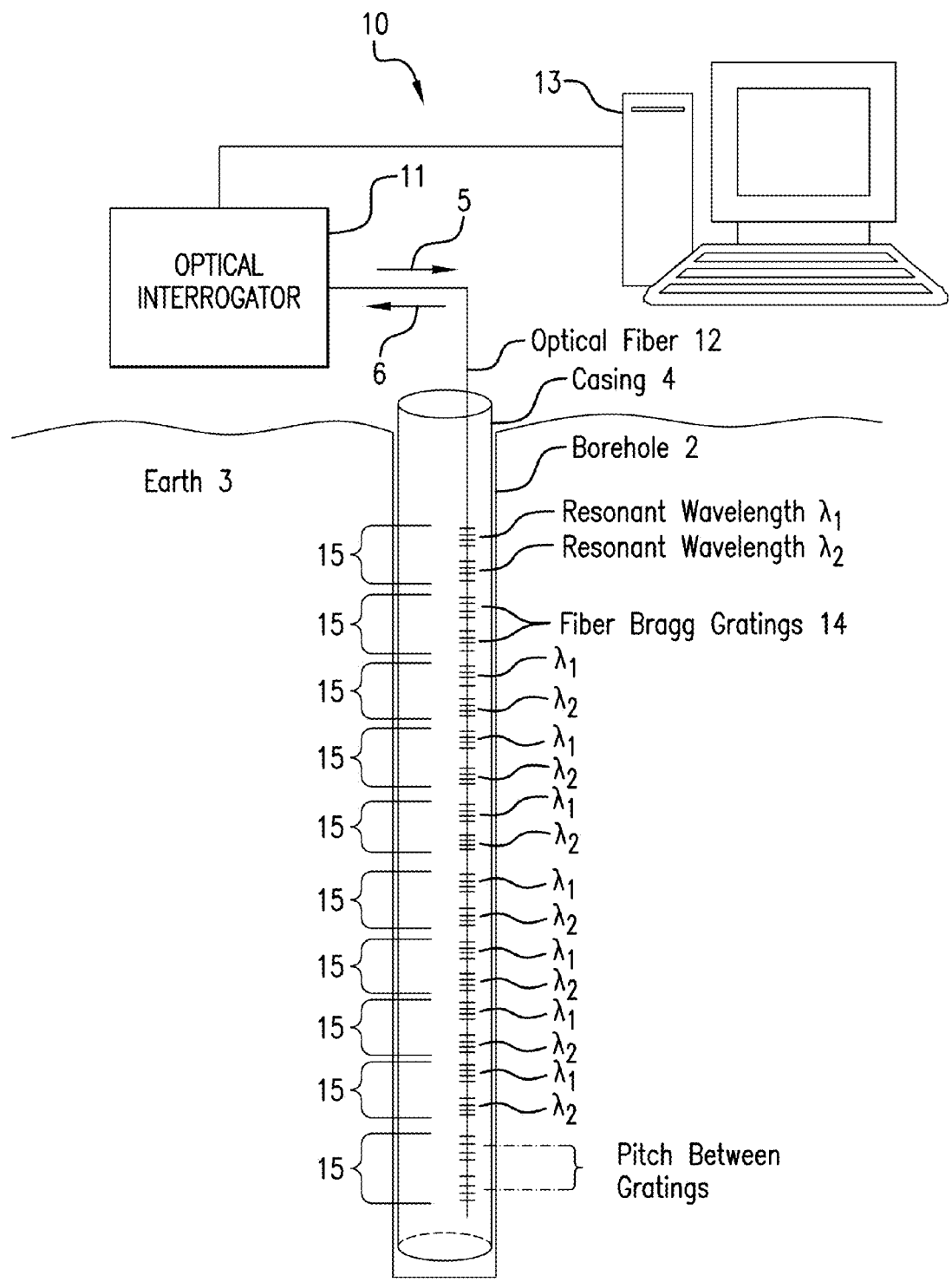
FIG. 1 illustrates a cross-sectional view of an exemplary embodiment of an optical sensing system having an optical fiber with fiber Bragg gratings disposed in a borehole penetrating the earth.
Figure 2:
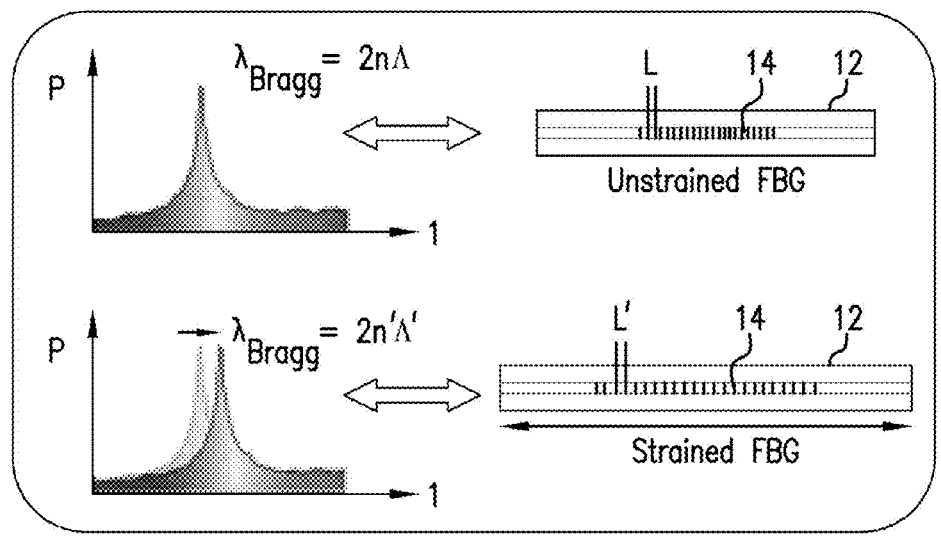
FIG. 2 depicts aspects of a resonant wavelength shift in a fiber Bragg grating for measuring a downhole parameter.

FIG. 1 illustrates a simplified schematic diagram of an optical sensing system 10. The optical system 10 includes an optical interrogator 11 in optical communication with an optical fiber 12. The optical fiber 12 includes a series of sensors referred to as fiber Bragg gratings 14. Each fiber Bragg grating 14 is configured to act as a filter to reflect incoming light at or near a resonant frequency characteristic of the fiber Bragg grating and to let the light of the other frequencies pass. Imposing a force or temperature change on the grating will cause the grating to distort and cause a shift in the resonant wavelength (or corresponding frequency) as illustrated in FIG. 2. By measuring the amount of the shift, the amplitude of the force or parameter causing the force, such as temperature change, can be measured. For example, the following equation may be used to correlate the shift in resonant wavelength to the change in temperature of the grating:

$$[\Delta\lambda B/\lambda B] = (1-pe)\epsilon + (\alpha\Lambda + \alpha n)\Delta T$$

where $\Delta\lambda B/\lambda B$ is the relative shift in the Bragg wavelength due to an applied strain ($\epsilon$) and a change in temperature ($\Delta T$), p e is the strain optic coefficient, $\alpha\Lambda$ is the thermal expansion coefficient of the optical fiber, and $\alpha$ n is the thermo-optic coefficient.

Non-limiting embodiments of the types of measurements performed by the fiber Bragg gratings include pressure, temperature, strain, force, acceleration, shape, and chemical composition. In non-limiting embodiments, the length of each fiber Bragg grating may be in a range of from a few millimeters to about two centimeters depending on the desired response characteristics of the gratings.

The optical fiber 12 in FIG. 1 is shown affixed to a casing 4 that is disposed in a borehole 2 penetrating the earth 3. The casing 4 represents any equipment, apparatus, or material that the optical fiber 12 may be used to perform measurements on. Additionally, environmental conditions in the borehole may be monitored or measured using the optical fiber 12.

Figure 3:
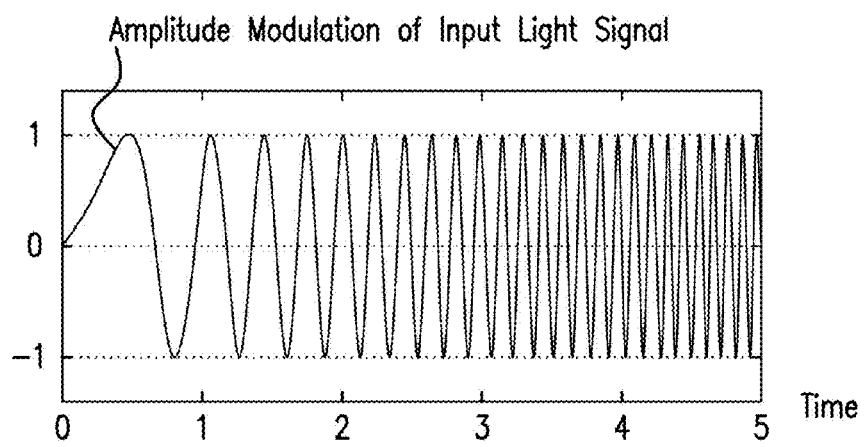
FIG. 3 depicts aspects of a chirped optical signal for interrogating the fiber Bragg gratings.

The optical interrogator 11 is configured to measure the shift in the resonant wavelength (or corresponding resonant frequency), if any, in each fiber Bragg grating and to determine the location in the optical fiber of each fiber Bragg grating being interrogated. In order to measure the resonant wavelength shifts and grating locations, the optical interrogator 11 is configured to transmit input light 5 into the optical fiber 12 and to receive reflected light 6 (also referred to as return light). The transmitted input light 5 and the reflected light 6 are transmitted and processed, respectively, in accordance with a method referred to as Incoherent Optical Frequency Domain Reflectometry (IOFDR). The amplitude of the input light 5 is chirped such that the input light amplitude varies such as in accordance with an increasing frequency as illustrated in FIG. 2. In one or more embodiments, the modulation frequency range of the chirp varies from 100 MHz to 1 GHz. The chirp frequency may be represented mathematically as $f_m(t) = kt + f_o$, while the amplitude as a function of time may be represented mathematically as $A(t) = A \cos(\pi kt^2 + 2\pi f_0 t + \theta_0)$. In addition, the wavelength (or corresponding frequency) of the input light 5 is swept. The wavelength sweep can be continuous while the input light 5 is being chirped repeatedly or the wavelength sweep can be in steps (stopping at each desired wavelength) to build the reflectivity of the gratings as a function of wavelength. In one or more embodiments, the bandwidth of the light wavelength sweep in about 50 nm. The term "chirp" is indicative of the small amount of time during which the chirp or the amplitude variations occurs with respect to the relatively large amount of time during which the light frequency is swept. In one or more embodiments, the time duration of a chirp is one millisecond while the time duration a frequency sweep is two seconds. Hence, the time duration of the wavelength sweep is at least a thousand times greater than the time duration of the chirp. FIG. 3 illustrates on example of a chirp for modulating the input light 5. For teaching purposes, the amplitude in FIG. 3 ranges nominally from −1 to +1 to depict aspects of amplitude modulation in a chirp realizing that the amplitudes may range from 0% to 100% in a non-limiting embodiment. The input light 5 having the chirp and swept wavelength has mathematical characteristics of a frequency domain signal and, hence, may be referred to as the frequency domain input light signal.

Accordingly, the reflected light 6 may be referred to as the frequency domain return light signal. Because the reflected light 6 is in the frequency domain, the reflected light 6 is processed using a Fast Fourier Transform (FFT) to transform the information contained in the reflected light 6 into the time domain. Once transformed into the time domain, the information in the reflected light 6 provides the magnitude or amount of the resonant wavelength shift of each fiber Bragg grating and its corresponding location in the optical fiber 12 knowing it will take a longer amount of time for the input light to reach and return from the gratings farther away from the optical interrogator 11 than those gratings that are closer.

Still referring to FIG. 1, a computer processing system 13 is coupled to the optical interrogator 11. The computer processing system 13 is configured to process the reflected light 6. For example, the computer processing system 13 can perform the FFT on received reflected light 6. Further, the computer processing system 13 can convert the magnitude of the resonant frequency shift into a parameter of interest such as temperature or strain for example using a mathematical relationship between parameter and the magnitude of the resonant frequency shift. The computer processing system 13 can be standalone or incorporated into the optical interrogator 11. Once the values of the parameter of interest are determined, it can be displayed to a user via a display or printer, it can be recorded for future use, or it can be input into an algorithm requiring that parameter for execution.

Figure 4:
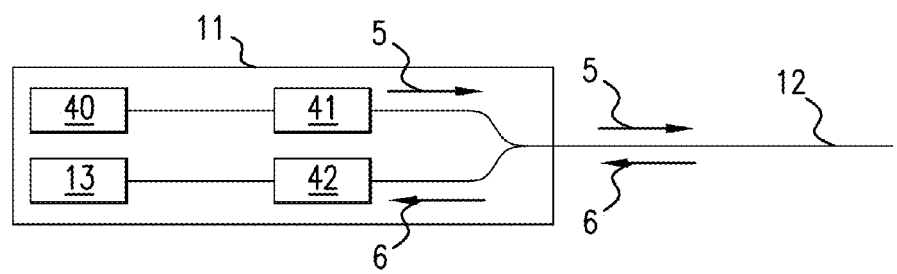
FIG. 4 depicts aspects of an optical interrogator.

FIG. 4 depicts aspects of the optical interrogator 11. The optical interrogator 11 includes a wavelength (or frequency) tunable light source 40 configured to generate a continuous wave of the input light 5 at a constant first frequency. To modulate the light input 5, the optical interrogator 11 includes a modulator 41 in optical communication with the tunable light source 40. The light input 5 is modulated (generally as a sine wave) to provide the chirp discussed above. The frequency of modulation is then swept by the modulator 41 to a second modulation frequency in a time-linear manner. While the wavelength of the input light 5 may be stepped or swept (i.e., is time-linear manner), the frequency of the amplitude modulation in the chirp is generally always swept. The reflected light 6 is received from the optical fiber 12 resulting from the change in the frequency of modulation. The optical interrogator 11 can have one light source 40 that is tunable to provide more than one optical wavelength of light input 5 or multiple light sources 40 may be used with each configured to provide one or more optical wavelengths of the input light 5.

Still referring to FIG. 4, the reflected light 6 is detected by a light detector 42 and then inversely transformed by the computer processing system 13 using the FFT into the time domain. Recognizing that time can be correlated to a spatial location by way of time of flight, reflections can then be correlated to a spatial location along the optical fiber 12 to produce a first set of measurements. Multiple measurements may be performed for each change in wavelength of the input light 5 as the wavelength of the input light 5 is swept. The frequency difference between input light 5 and the reflected light 6 is proportional to the time of flight (or distance), while the intensity of the reflected light 6 is a measure of the reflectivity of the grating at the current laser frequency.

Due to present day limitations of opto-electronics, prior art embodiments in IOFDR interrogation are limited to about one meter spatial resolution between adjacent fiber Bragg gratings. This is a direct consequence of the available modulation bandwidth of the interrogation electronics. With a modulation sweep from 100 MHz to 1 GHz, a spatial sampling of 0.1125 m is produced. With a conservative grating to sample ratio of 5, the minimum grating spacing between adjacent gratings is 0.56 m. (In general, the gratings are read from a continuous curve where peaks are at grating locations and the points between the peaks relate to values, which may include a noise floor, between grating locations. The spacing between samples is generally a function of laser bandwidth. It is desired to obtain enough sample points to have a smooth curve fit. About five sample points per grating, one at the grating and four between adjacent gratings, are generally enough to easily discriminate between adjacent gratings. If the number of sample points was reduced to two sample points per grating, then the grating images or readings may smear together.) Decreasing this distance would require higher modulation frequencies, which becomes impractical given the current state of the art electronics. However, as disclosed herein, wave division multiplexing (WDM) can improve the spatial resolution by a factor of 2 or more. The laser bandwidth can be partitioned into N segments. For example, a current state of the art laser has about 60 nm of bandwidth from 1530 to 1590 nm. This bandwidth can be partitioned into two segments (N=2) from 1530-1560 nm and 1560-1590 nm. Gratings are written into the sensing fiber in an interleaved fashion with alternating reference or nominal (i.e., at reference conditions) resonant wavelengths. For a two segment fiber (i.e., fiber having gratings interleaved with two different resonant wavelengths) example, the odd numbered gratings may have a nominal wavelength of 1540 nm, and the even numbered gratings may have a nominal wavelength 1570 nm. Since the operating bandwidth of a fiber-Bragg grating over 200° C. is only about 5 nm, gratings from the two segments do not overlap during operation thus avoiding interference from an adjacent grating. Since the gratings in the different segments do not overlap over the temperature range, they can be interrogated separately, without affecting each other. For a sensing fiber with two interleaved grating nominal resonant wavelengths, the spatial resolution (i.e., separation between adjacent gratings) can be cut in half. It can be appreciated that separation between adjacent grating can be decreased even further by interleaving three or more different resonant wavelengths in the optical fiber. For example, 60 nm of laser bandwidth can be partitioned into more segments of smaller bandwidth such as ten segments (N=10). With ten interleaved resonant wavelengths, the spatial resolution may be decreased to less than 10 cm without interference from adjacent gratings.

For teaching purposes, the optical fiber 12 has a series of sections 15 as illustrated in FIG. 1. Each section 15 has two fiber Bragg gratings, each with a nominal resonant wavelength that is different from the nominal resonant wavelength of the other grating. In the embodiment of FIG. 1, one fiber Bragg grating in each section 15 has a nominal resonant wavelength of $\lambda_1$ and the other fiber Bragg grating has a nominal resonant wavelength of $\lambda_2$. In this manner, the nominal resonant wavelengths of the gratings are interleaved such that there are no two gratings having the same nominal resonant wavelength that are adjacent to each other. In other embodiments, each section 15 may have three or more fiber Bragg gratings, each with a nominal resonant wavelength that is different from the nominal resonant wavelength of the other gratings and positioned such that two gratings having the same nominal resonant wavelength are not adjacent to each other. It can be appreciated that increasing the number of gratings in each section may decrease the spacing between adjacent gratings with causing interference between readings of the gratings. In one or more embodiment, the distance between adjacent gratings may be the same (i.e., fixed pitch) throughout the optical fiber 12. In other embodiments, the distance between adjacent gratings may be varied such that the distance is decreased in monitored areas of interest and increased in monitored areas that do not require increased resolution.

Figure 5:
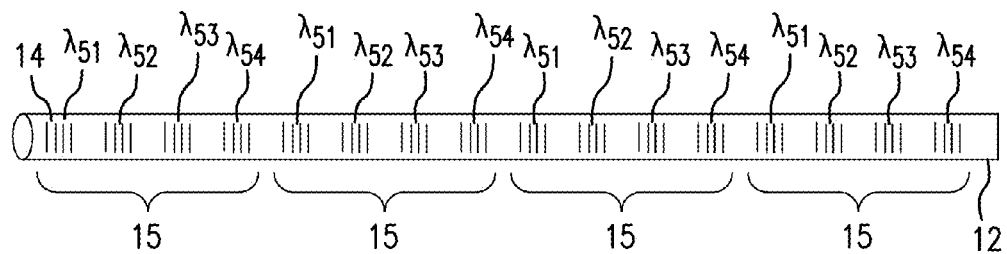
FIG. 5 depicts aspects of the optical fiber having a plurality of sections of fiber Bragg gratings with each section having gratings with a resonant wavelength that is different from the resonant wavelengths of other gratings in the section.

FIG. 5 illustrates an embodiment of the optical fiber 12 where each section 15 has four fiber Bragg gratings. Each section 15 in the embodiment of FIG. 5 has one grating with nominal resonant wavelength $\lambda_{51}$, one grating with nominal resonant wavelength $\lambda_{52}$, one grating with nominal resonant wavelength $\lambda_{53}$, and one grating with nominal resonant wavelength $\lambda_{54}$. In one or more embodiments, the pattern of $\lambda_{51}$, $\lambda_{52}$, $\lambda_{53}$, $\lambda_{54}$ repeats itself throughout the optical fiber 12. In other embodiments, the resonant wavelength pattern may not repeat itself as long as two gratings having the same resonant wavelength are not adjacent to each other.

In one or more embodiments, the optical fiber 12 may have a length that exceeds several kilometers. In one or more embodiments, the time duration of the wavelength sweep of the input light may be one second while the time duration of the chirp may be ten milliseconds to give a ratio of at least 100. In one or more embodiments, the time duration of the chirp may be ten milliseconds or less. In one or more embodiments, the distance between adjacent fiber Bragg gratings may be ten cm or less.

Figure 6:
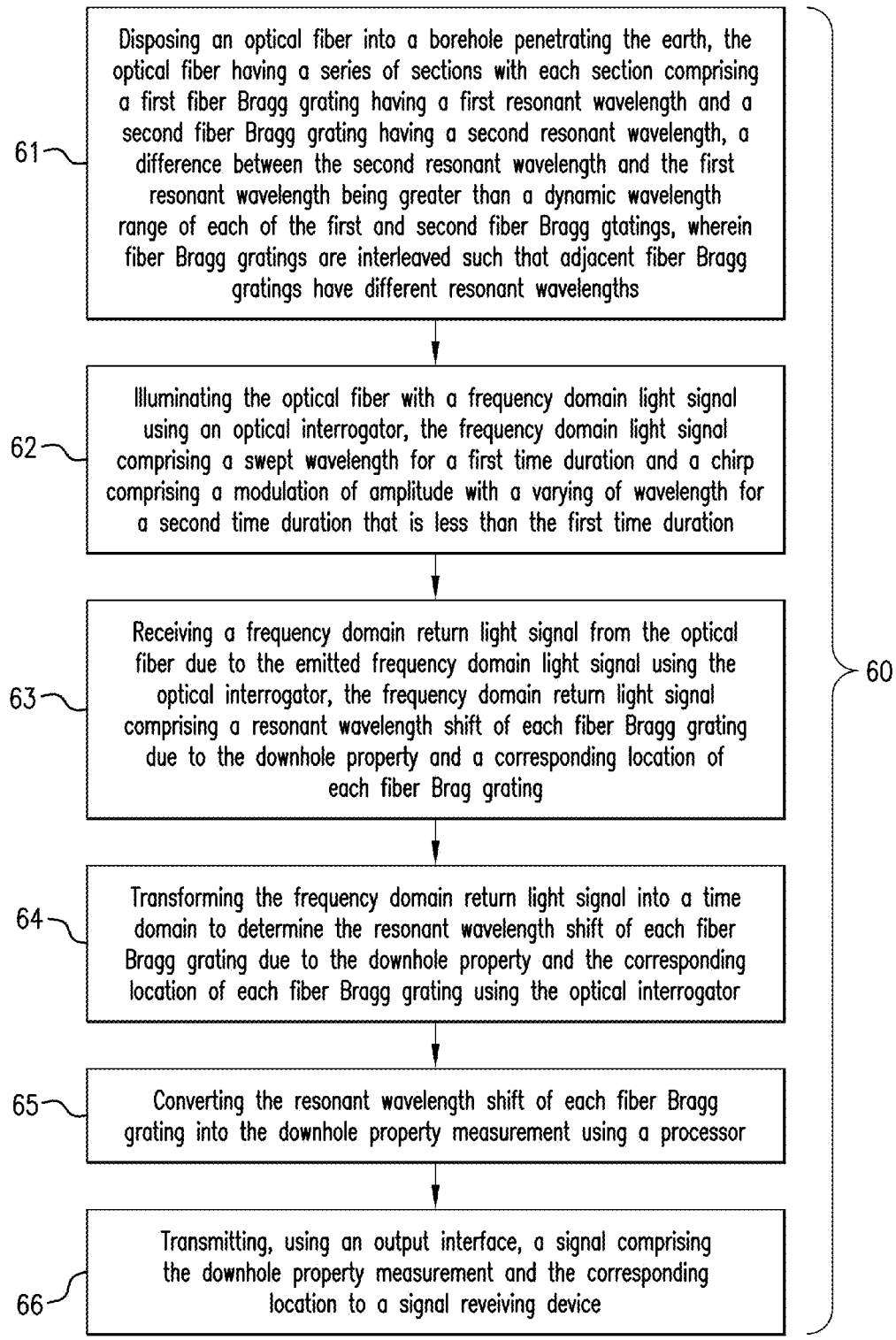
FIG. 6 is a flow chart for a method for performing a measurement of a property downhole.

FIG. 6 is a flow chart for a method 60 for performing a measurement of a downhole property. Block 61 calls for disposing an optical fiber into a borehole penetrating the earth, the optical fiber having a series of sections with each section having a first fiber Bragg grating having a first resonant wavelength and a second fiber Bragg grating having a second resonant wavelength, a difference between the second resonant wavelength and the first resonant wavelength being greater than a dynamic wavelength range of each of the first and second fiber Bragg gratings, wherein fiber Bragg gratings are interleaved such that adjacent fiber Bragg gratings have different resonant wavelengths. Block 62 calls for illuminating the optical fiber with a frequency domain light signal using an optical interrogator, the frequency domain light signal having a swept wavelength for a first time duration and a chirp having a modulation of amplitude with a varying of wavelength for a second time duration that is less than the first time duration. Block 63 calls receiving a frequency domain return light signal from the optical fiber due to the emitted frequency domain light signal using the optical interrogator, the frequency domain return light signal having a resonant wavelength shift of each fiber Bragg grating due to the downhole property and a corresponding location of each fiber Brag grating. Block 64 calls for transforming the frequency domain return light signal into a time domain to determine the resonant wavelength shift of each fiber Bragg grating due to the downhole property and the corresponding location of each fiber Bragg grating using the optical interrogator. Block 65 calls for converting the resonant wavelength shift of each fiber Bragg grating into the downhole property measurement using a processor. Block 66 calls for transmitting, using an output interface, a signal having the downhole property measurement and the corresponding location to a signal receiving device.

The method 60 may also include displaying the downhole property measurement and the corresponding location to a user using a display or a printer. The method 60 may also include at least one of (i) displaying the downhole property measurement of each fiber Bragg grating and corresponding location of each fiber Bragg grating to a user using a user interface, (ii) providing an alert signal if any downhole property measurement exceeds a threshold, and (iii) storing the downhole property measurement of each fiber Bragg grating and corresponding location of each fiber Bragg grating in a memory or storage device. The method 60 may further include coupling the optical fiber to a downhole structure where the optical fiber is configured to measure a property of the downhole structure.

The disclosed apparatus and method provide the advantage of being able to space the fiber Bragg gratings closer together than would be possible with the current available opto-electronics and thus provide increased resolution in monitored areas of interest. This in turn enables shape sensing with increased resolution of structures to which the optical fiber is attached. For example, without wave division multiplexing (i.e., having gratings with only one nominal resonant wavelength or N=1), a minimum grating spacing of 56 cm is achievable with five samples per grating, 900 MHz modulation sweep, and gratings having 5 nm dynamic wavelength range. Using wave division multiplexing as disclosed herein, smaller spacing between adjacent gratings is achieved. To get less than 50 cm spacing, a multiplexing factor of at least two (N=2) is used (56 cm/N<50 cm). The laser bandwidth is divided into two ranges such as 1530 nm-1550 nm and 1550 nm-1570 nm for example. With N=2, there are gratings having two interleaved nominal resonant wavelengths—$\lambda_1, \lambda_2, \lambda_1, \lambda_2$, etc. A minimum spacing of 28 cm (half of 56 cm) is thus achieved. To get less than 25 cm spacing, the wave division multiplexing factor may be selected to be three (N=3) to achieve 18.67 cm spacing (56 cm/3=18.67 cm). Here, the laser bandwidth or wavelength range may be divided into three ranges for interrogating gratings having three nominal resonant wavelengths. For this example, the ranges may be 1530 nm-1540 nm, 1540 nm-1550 nm, and 1550 nm-1560 nm. The ranges do not necessarily have to occupy the full laser bandwidth. The gratings with the three nominal resonant wavelengths for this example may be interleaved as—$\lambda_1, \lambda_2, \lambda_3, \lambda_1, \lambda_2, \lambda_3$, etc. To get less than 10 cm spacing, the wave division multiplexing may be selected to be six (N=6) to a achieve 9.33 cm spacing (56 cm/6=9.33 cm). With the laser having 30 nm of sweep range, the laser range can be divided into six sub-ranges, such as 1530 nm-1535 nm, 1535 nm-1540 nm, 1540 nm-1545 nm, etc., for interrogating gratings having six nominal resonant wavelengths. The gratings with the six nominal resonant wavelengths for this example may be interleaved as—$\lambda_1, \lambda_2, \lambda_3, \lambda_4, \lambda_5, \lambda_6, \lambda_1, \lambda_2, \lambda_3, \lambda_4, \lambda_5, \lambda_6$, etc. With a laser that has a 40 nm wavelength range and gratings with 5 nm dynamic range, the largest N can be is eight to give a minimum grating spacing of seven cm (56 cm/8=7 cm). With a laser having a wavelength range of more than 40 nm such as 50 nm or higher, the spacing between adjacent gratings can go even lower. If the laser has a 160 nm wavelength range, N can be as large as 32, which reduces the grating spacing down to 1.75 cm for gratings having a dynamic range of 5 nm.

It can be appreciated that a sensing region of the optical fiber (i.e., region having the interleaved fiber Bragg gratings) may have a length of one kilometer or longer, although shorter sensing regions may be used depending on the application.

In support of the teachings herein, various analysis components may be used, including a digital and/or an analog system. For example, the optical interrogator 11 or the computer processing system 13 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. Processed data such as a result of an implemented method may be transmitted as a signal via a processor output interface to a signal receiving device. The signal receiving device may be a display monitor or printer for presenting the result to a user. Alternatively or in addition, the signal receiving device may be memory or a storage medium. It can be appreciated that storing the result in memory or the storage medium will transform the memory or storage medium into a new state (containing the result) from a prior state (not containing the result). Further, an alert signal may be transmitted from the processor to a user interface if the result exceeds a threshold value.

Further, various other components may be included and called upon for providing for aspects of the teachings herein. For example, a power, cooling component, heating component, magnet, electromagnet, sensor, electrode, transmitter, receiver, transceiver, antenna, controller, optical unit (e.g., lenses, splitters, couplers), electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" do not denote a particular order, but are used to distinguish different elements. The term "coupled" relates to a first device being coupled to a second device either directly or indirectly via an intermediate device.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for performing a measurement of a downhole property, the apparatus comprising:
   an optical fiber having a series of sections with each section comprising a first fiber Bragg grating having a first resonant wavelength and a second fiber Bragg grating having a second resonant wavelength, a difference between the second resonant wavelength and the first resonant wavelength being greater than a dynamic wavelength range of each of the first and second fiber Bragg gratings, wherein fiber Bragg gratings are interleaved such that adjacent fiber Bragg gratings have different resonant wavelengths;
   an optical interrogator in optical communication with the optical fiber and configured to: emit a frequency domain light signal into the optical fiber, the frequency domain light signal comprising a swept wavelength for a first time duration and a chirp comprising a modulation of amplitude with a varying of wavelength for a second time duration that is less than the first time duration; receive a frequency domain return light signal from the optical fiber due to the emitted frequency domain light signal, the frequency domain return light signal comprising a resonant wavelength shift of each fiber Bragg grating due to the downhole property and a corresponding location of each fiber Bragg grating; and transform the frequency domain return signal into a time domain in order to determine the resonant wavelength shift of each fiber Bragg grating and the corresponding location of each interrogated fiber Bragg grating;
   a processor configured to convert the resonant wavelength shift of each interrogated fiber Bragg grating into the downhole property measurement; and
   an output interface coupled to the processor and configured to transmit a signal comprising the downhole property measurement and a corresponding location of the downhole property measurement to a signal receiving device.

2. The apparatus according to claim 1, wherein the second fiber Bragg grating comprises a plurality of fiber Bragg gratings, each fiber Bragg grating in the plurality comprising a resonant wavelength that is different from the resonant wavelengths of the other fiber Bragg gratings in the plurality and the first fiber Bragg grating.

3. The apparatus according to claim 2, wherein a pattern of fiber Bragg gratings with associated resonant wavelengths is the same for each section in the series of sections.

4. The apparatus according to claim 1, wherein first time duration is at least 100 times greater than the second time duration.

5. The apparatus according to claim 4, wherein the second time duration is ten milliseconds or less.

6. The apparatus according to claim 1, wherein a distance between adjacent fiber Bragg gratings is less than 50 cm.

7. The apparatus according to claim 6, wherein the distance between adjacent fiber Bragg gratings is less than 25 cm.

8. The apparatus according to claim 7, wherein the distance between adjacent fiber Bragg gratings is less than 10 cm.

9. The apparatus according to claim 1, wherein the optical interrogator comprises a laser configured to emit a laser beam with a swept wavelength range of 50 nm or greater.

10. The apparatus according to claim 1, wherein a dynamic range of each fiber Bragg grating is 5 nm or less.

11. The apparatus according to claim 10, wherein a difference between the first resonant wavelength and the second resonant wavelength is at least 5 nm.

12. The apparatus according to claim 1, wherein the signal receiving device comprises at least one of a display, a printer, a storage medium and memory.

13. The apparatus according to claim 1, wherein the optical fiber is coupled to a downhole structure and configured to measure a property of the downhole structure.

14. The apparatus according to claim 1, wherein the optical fiber is configured to measure a downhole environment property.

15. The apparatus according to claim 1, wherein the optical interrogator is configured to measure a resonant wavelength shift of all fiber Bragg gratings having the same resonant wavelength at one time and combining the measurements to provide a composite reading of all the fiber Bragg gratings inscribed in the optical fiber.

16. A method for performing a measurement of a downhole property, the method comprising:
   disposing an optical fiber into a borehole penetrating the earth, the optical fiber having a series of sections with each section comprising a first fiber Bragg grating having a first resonant wavelength and a second fiber Bragg grating having a second resonant wavelength, a difference between the second resonant wavelength and the first resonant wavelength being greater than a dynamic wavelength range of each of the first and second fiber Bragg gratings, wherein fiber Bragg gratings are interleaved such that adjacent fiber Bragg gratings have different resonant wavelengths;
   illuminating the optical fiber with a frequency domain light signal using an optical interrogator, the frequency domain light signal comprising a swept wavelength for a first time duration and a chirp comprising a modulation of amplitude with a varying of wavelength for a second time duration that is less than the first time duration;
   receiving a frequency domain return light signal from the optical fiber due to the emitted frequency domain light signal using the optical interrogator, the frequency domain return light signal comprising a resonant wavelength shift of each fiber Bragg grating due to the downhole property and a corresponding location of each fiber Brag grating;
   transforming the frequency domain return light signal into a time domain to determine the resonant wavelength shift of each fiber Bragg grating due to the downhole property and the corresponding location of each fiber Bragg grating using the optical interrogator;

converting the resonant wavelength shift of each fiber Bragg grating into the downhole property measurement using a processor; and transmitting, using an output interface, a signal comprising the downhole property measurement and the corresponding location to a signal receiving device.

17. The method according to claim 16, further comprising displaying the downhole property measurement and the corresponding location to a user using a display or a printer.

18. The method according to claim 17, further comprising at least one of (i) displaying the downhole property measurement of each fiber Bragg grating and corresponding location of each fiber Bragg grating to a user using a user interface, (ii) providing an alert signal if any downhole property measurement exceeds a threshold, and (iii) storing the downhole property measurement of each fiber Bragg grating and corresponding location of each fiber Bragg grating in a memory or storage device.

19. The method according to claim 17, further comprising coupling the optical fiber to a downhole structure, the optical fiber being configured to measure a property of the downhole structure.

\* \* \* \* \*